US009650066B2

(12) United States Patent
Nakamura et al.

(10) Patent No.: US 9,650,066 B2
(45) Date of Patent: May 16, 2017

(54) ELECTRIC POWER STEERING APPARATUS

(71) Applicant: NSK LTD., Shinagawa-ku, Tokyo (JP)

(72) Inventors: Fumitoshi Nakamura, Tokyo (JP); Tomonori Hisanaga, Tokyo (JP)

(73) Assignee: NSK LTD., Tokyo (JP)

( * ) Notice: Subject to any disclaimer, the term of this patent is extended or adjusted under 35 U.S.C. 154(b) by 77 days.

(21) Appl. No.: 14/431,563

(22) PCT Filed: Sep. 2, 2014

(86) PCT No.: PCT/JP2014/073046
§ 371 (c)(1),
(2) Date: Mar. 26, 2015

(87) PCT Pub. No.: WO2016/035136
PCT Pub. Date: Mar. 10, 2016

(65) Prior Publication Data
US 2016/0257336 A1   Sep. 8, 2016

(51) Int. Cl.
*B62D 6/00* (2006.01)
*B62D 5/04* (2006.01)
*G01B 7/30* (2006.01)

(52) U.S. Cl.
CPC .............. *B62D 5/046* (2013.01); *B62D 5/04* (2013.01); *B62D 6/00* (2013.01); *B62D 6/002* (2013.01); *G01B 7/30* (2013.01)

(58) Field of Classification Search
CPC .......... B62D 6/00; B62D 6/002; B62D 6/008; B62D 6/08; B62D 6/10; B62D 5/04;

(Continued)

(56) References Cited

U.S. PATENT DOCUMENTS 3,934,459 A * 1/1976 Wolfinger ................ G01H 1/10
                                                            73/650
5,734,108 A * 3/1998 Walker .................... G01P 3/486
                                                            73/650

(Continued)

FOREIGN PATENT DOCUMENTS

JP          6-65967 A       3/1994
JP       2003-516534 A      5/2003

(Continued)

OTHER PUBLICATIONS

Written Opinion of PCT/JP2014/073046, dated Dec. 9, 2014. [PCT/ISA/237].

*Primary Examiner* — Stephen Holwerda
(74) *Attorney, Agent, or Firm* — Sughrue Mion, PLLC

(57) ABSTRACT

An electric power steering apparatus having a function for detecting a steering speed, includes a time stamp attaching section that attaches a time stamp (ATi) to a detection signal (Ai) and attaches a time stamp (BTj) to a detection signal (Bj); a storing section that stores the detection signal (Bj) to which the time stamp (BTj) is attached; a synchronous signal searching section that searches the detection signal (Bj) most synchronized with the detection signal (Ai) based on the time stamps (ATi and BTj); a vernier calculating section that performs a calculation of an angle difference between synchronous signals searched by the synchronous signal searching section and a vernier calculation and outputs an absolute steering angle of a sensor reference; an initial steering angle calculating section that calculates an initial steering angle value from the absolute steering angle; and a steering angle output section that obtains a steering angle.

9 Claims, 8 Drawing Sheets

(58) Field of Classification Search
CPC .... B62D 5/0409; B62D 5/0457; B62D 5/046; B62D 5/0463
See application file for complete search history.

(56) References Cited

U.S. PATENT DOCUMENTS

| | | | |
|---|---|---|---|
| 2003/0145663 A1* | 8/2003 | Heisenberg | B62D 6/10 |
| | | | 73/862.324 |
| 2004/0007663 A1 | 1/2004 | Steinlechner et al. | |
| 2004/0056184 A1* | 3/2004 | Steinlechner | B62D 6/10 |
| | | | 250/231.14 |
| 2009/0125187 A1* | 5/2009 | Yamamoto | B62D 5/0457 |
| | | | 701/42 |
| 2011/0128528 A1* | 6/2011 | Al-Rawi | B62D 6/10 |
| | | | 356/138 |
| 2013/0166142 A1* | 6/2013 | Jang | B62D 15/0245 |
| | | | 701/34.4 |

FOREIGN PATENT DOCUMENTS

| | | |
|---|---|---|
| JP | 2008-310634 A | 12/2008 |
| JP | 2012-88116 A | 5/2012 |
| JP | 2012-98166 A | 5/2012 |
| JP | 2012-211857 A | 11/2012 |
| JP | 2013-142699 A | 7/2013 |
| JP | 2014-86966 A | 5/2014 |
| WO | 2012/125259 A1 | 9/2012 |

* cited by examiner

ELECTRIC POWER STEERING APPARATUS

CROSS REFERENCE TO RELATED APPLICATIONS

This application is a National Stage of International Application No. PCT/JP2014/073046 filed Sep. 2, 2014, the contents of all of which are incorporated herein by reference in their entirety.

TECHNICAL FIELD

The present invention relates to an electric power steering apparatus that provides a steering system of a vehicle with an assist force generated by a motor, and in particular to an electric power steering apparatus that is capable of taking an accurate synchronization and suppressing an angle error proportional to a steering speed by attaching (tying) a time stamp to each detection signal of plural sensors, and raises a steering speed that a steering angle detection is established.

BACKGROUND ART

An electric power steering apparatus which provides a steering mechanism of a vehicle with a steering assist torque (an assist torque) by means of a rotational torque of a motor, applies a driving force of the motor as the steering assist torque to a steering shaft or a rack shaft by means of a transmission mechanism such as gears or a belt through a reduction mechanism. In order to accurately generate the steering assist torque, such a conventional electric power steering apparatus (EPS) performs a feedback control of a motor current. The feedback control adjusts a voltage supplied to the motor so that a difference between a steering assist command value (a current command value) and a detected motor current value becomes small, and the adjustment of the voltage applied to the motor is generally performed by an adjustment of duty command values of a pulse width modulation (PWM) control.

A general configuration of the conventional electric power steering apparatus will be described with reference to FIG. 1. As shown in FIG. 1, a column shaft (a steering shaft or a handle shaft) 2 connected to a steering wheel 1, is connected to steered wheels 8L and 8R through reduction gears 3, universal joints 4a and 4b, a rack and pinion mechanism 5, and tie rods 6a and 6b, further via hub units 7a and 7b. In addition, the column shaft 2 is provided with a torque sensor 10 for detecting a steering torque of the steering wheel 1, and a motor 20 for assisting the steering force of the steering wheel 1 is connected to the column shaft 2 through the reduction gears 3. Electric power is supplied to a control unit (ECU) 30 for controlling the electric power steering apparatus from a battery 13, and an ignition key signal is inputted into the control unit 30 through an ignition key 11. The control unit 30 calculates a current command value of an assist (steering assist) command on the basis of a steering torque Th detected by the torque sensor 10 and a vehicle speed Vel detected by a vehicle speed sensor 12, and controls a current supplied to the motor 20 on the basis of a current control value E obtained by performing compensation and so on with respect to the current command value. Moreover, it is also possible to receive the vehicle speed Vel from a controller area network (CAN) and so on.

The control unit 30 mainly comprises a CPU (also including an MPU), and general functions performed by programs within the CPU are shown in FIG. 2.

Functions and operations of the control unit 30 will be described with reference to FIG. 2. As shown in FIG. 2, the steering torque Th detected by the torque sensor 10 and the vehicle speed Vel detected by the vehicle speed sensor 12 are inputted into a current command value calculating section 31 for calculating a current command value Iref1. The current command value calculating section 31 calculates the current command value Iref1 that is a control target value of a current supplied to the motor 20 based on the steering torque Th being inputted and the vehicle speed Vel being inputted and by means of an assist map or the like. The current command value Iref1 is inputted into a current limiting section 33 through an adding section 32A. A current command value Irefm that a maximum current is limited, is inputted into a subtracting section 32B, and a deviation I(=Irefm−Im) between the current command value Irefm and a motor current value Im being fed back, is calculated. The deviation I is inputted into a PI control section 35 for characteristic improvement of steering operations. A voltage control command value Vref that the characteristic improvement is performed by the PI control section 35, is inputted into a PWM control section 36. Furthermore, the motor 20 is PWM-driven through an inverter circuit 37 serving as a driving section. The current value Im of the motor 20 is detected by a motor current detector 38 and fed back to the subtracting section 32B. The inverter circuit 37 uses FETs as driving elements and is comprised of a bridge circuit of FETs.

Further, a compensation signal CM from a compensating section 34 is added in the adding section 32A, and compensation of the system is performed by the addition of the compensation signal CM so as to improve a convergence, an inertia characteristic and so on. The compensating section 34 adds a self-aligning torque (SAT) 343 and an inertia 342 in an adding section 344, further adds the result of addition performed in the adding section 344 and a convergence 341 in an adding section 345, and then outputs the result of addition performed in the adding section 345 as the compensation signal CM.

Such an electric power steering apparatus includes various sensors for detecting the steering angle of the column shaft (the steering shaft or the handle shaft) and for detecting a motor rotation angle and so on.

Conventionally, in order to raise a detection accuracy (detection resolution) of a rotation position by a rotation angle sensor, a rotation position detecting apparatus that combines plural sensors having displacement characteristics and detects the rotation position by a vernier (sub-scale) method, is proposed (for example, Japanese Published examined Patent Application No. H6-65967 B2: Patent Document 1). That is, the rotation position detecting apparatus of Patent Document 1 is a configuration that comprises a sensor having a first pattern of 1-pitch per rotation and a sensor having a second pattern that divides one circumference of the first pattern into "n" on the basis of a reference, and detects an absolute rotation position.

THE LIST OF PRIOR ART DOCUMENTS

Patent Documents

Patent Document 1: Japanese Published examined Patent Application No. H6-65967 B2

SUMMARY OF THE INVENTION

Problems to be Solved by the Invention

However, in the case of applying the rotation position detecting apparatus disclosed in Patent Document 1 to the electric power steering apparatus, when a combination of a steering's torque sensor that detects the steering torque via a torsion bar and a steering angle sensor that detects an absolute steering angle is used, it is necessary to further combine another sensor with the apparatus of Patent Document 1 via the torsion bar to constitute the torque sensor and detect the steering torque.

Further, in general, a steering angle range of the steering is about 1080° (one side 540°), in the case of performing the steering angle detection by using a single steering angle sensor, there is a problem that angle resolution becomes rough. Therefore, it is necessary to detect the angle by using the vernier calculation based on a combination of plural sensors. In this case, it becomes necessary to synchronize two sensors, and a synchronization accuracy is strongly requested.

Further, in the case of using the above combination sensors, since they are respectively independent sensors, there is a problem that the angle error becomes large depending on the steering speed. In particular, in the case of digital communication, since an error due to communication is also included, the angle error becomes larger.

The present invention has been developed in view of the above-described circumstances, and the object of the present invention is to provide a high-function electric power steering apparatus that is capable of taking an accurate synchronization and suppressing an angle error proportional to a steering speed by attaching (tying) a time stamp every time a detection signal from each sensor is received, and raises the steering speed that detection of a steering angle is established.

Means for Solving the Problems

The present invention relates to an electric power steering apparatus that performs an assist control of a steering by driving a motor by means of a current command value calculated on a basis of at least a steering torque, comprises at least sensors A and B being different in periods, and has a function to detect a steering speed, the above-described object of the present invention is achieved by that comprising: a time stamp attaching section that attaches a time stamp ATi to a detection signal Ai of said sensor A and attaches a time stamp BTj to a detection signal Bj of said sensor B; a storing section that stores said detection signal Bj to which said time stamp BTj is attached; a synchronous signal searching section that searches said detection signal Bj most synchronized with said detection signal Ai from said storing section based on said time stamps ATi and BTj; a vernier calculating section that performs a calculation of an angle difference between synchronous signals searched by said synchronous signal searching section and a vernier calculation and outputs an absolute steering angle pf a sensor reference; an initial steering angle calculating section that calculates an initial steering angle value from said absolute steering angle; and a steering angle output section that obtains a steering angle on a basis of a relative steering angle from said sensor B and said initial steering angle value.

Further, the above-described object of the present invention is more effectively achieved by that wherein comprising a comparing section that compares said steering speed with a threshold, and when said steering speed is less than or equal to said threshold, search of said synchronous signals, said calculation of said angle difference and said vernier calculation are performed; or wherein said threshold is a practical steering speed; or wherein said search of said synchronous signal searching section is a binary search.

Effects of the Invention

Since the angle error that the steering angle detection (vernier) is established depends on the sensor, the angle error that the steering angle detection (vernier) is established becomes a constant n value, the angle error of this case becomes the multiplication value of a steering angle speed and a time error. According to an electric power steering apparatus of the present invention, it is possible to reduce the time error and reduce the angle error proportional to the time error by implementing the synchronization of the sensor detection signals. Further, since it is possible to suppress and reduce the angle error, it is possible to raise the steering speed that the steering angle detection is possible.

MODE FOR CARRYING OUT THE INVENTION

An electric power steering apparatus of the present invention detects (calculates) a steering angle from angle signals of respectively independent angle sensors A and B that are mounted on the electric power steering apparatus by utilizing a principle of vernier (sub-scale) including a calculation of an angle difference. In the present invention, the period of the angle sensor A is long, and the angle sensor B is a sensor of output side of the torque sensor and one period of the angle sensor B becomes small (short). Since the angle sensor A and the angle sensor B are independent sensors, the synchronization thereof is not taken. Further, in order to establish the steering angle detection, in principle of a vernier calculation, it is necessary that an angle error of the angle sensor A and the angle sensor B is less than or equal to a constant value (the greatest common divisor of the detection angle range of each sensor).

In the case that the synchronization of plural sensors is not taken, the detection timing of each sensor deviates. Further, when the sensor is rotated (steered), an error occurs in a detected angle, and the angle error increases in proportion to the number of rotations (the steering speed). Therefore, a constraint condition "the steering angle is detectable only in the case of being less than or equal to a constant steering speed" for steering in the steering angle detection is brought. Due to the above constraint condition, startings of a driving support system to a driver based on the steering angle control or the like and of the steering angle control (EPS or the like) of vehicle side are delayed.

In this connection, the present invention attaches a time stamp at every time when each detection signal from plural sensors is received, ties the time stamp to the detection signal, and stores a predetermined time duration in a buffer memory. Then, the present invention searches a signal (a synchronous signal) closest to angle detection timings of the angle sensor A and the angle sensor B from the buffer memory, and enables the steering angle calculation with a minimum angle error. Thus, since it becomes possible to suppress the increasing of the angle error proportional to the steering angle speed, even in the case of fast steering speed, the vernier calculation is established.

Hereinafter, embodiments of the present invention will be described in detail with reference to the accompanying drawings.

Figure 1:
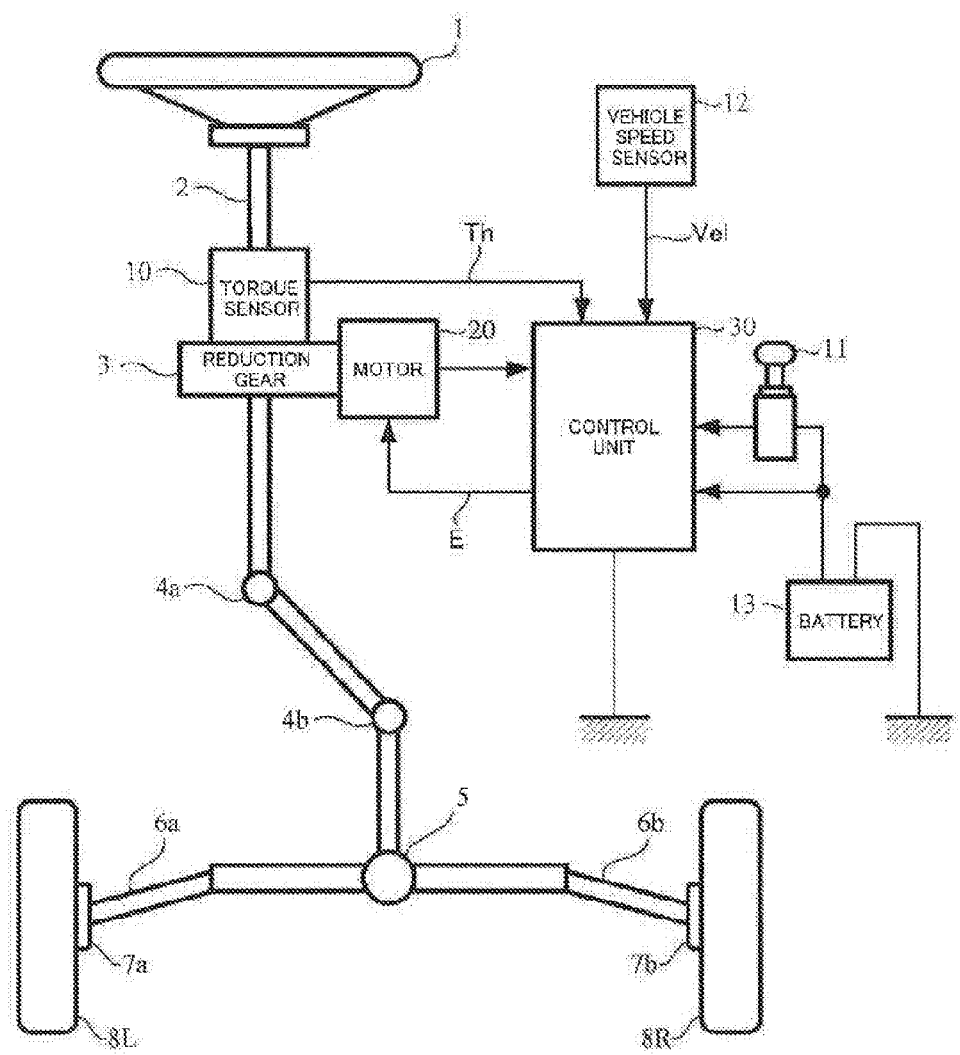
FIG. 1 is a configuration diagram illustrating a general outline of an electric power steering apparatus.
Figure 2:
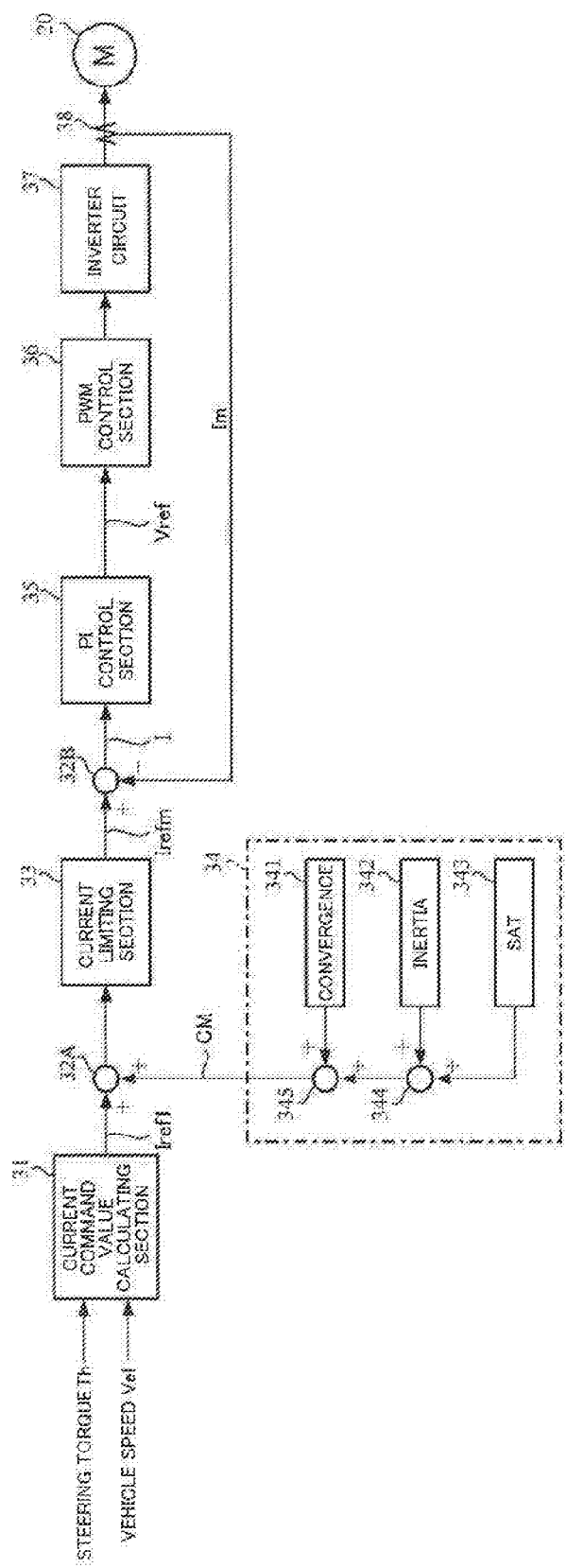
FIG. 2 is a block diagram showing a configuration example of a control system of the electric power steering apparatus.
Figure 3:
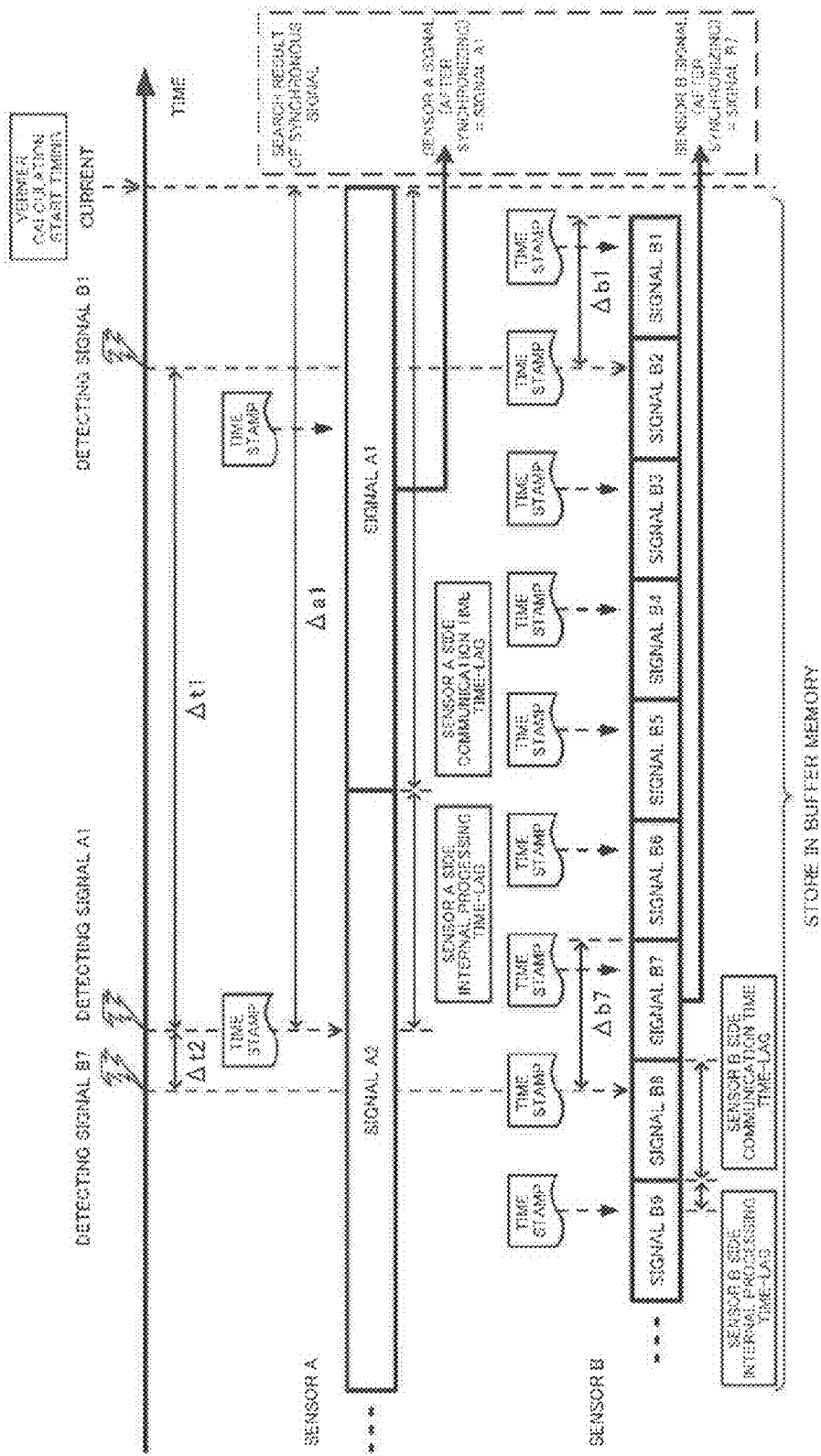
FIG. 3 is a diagram showing an error factor of detection signals of two sensors (A, B) and an improvement method.

FIG. 3 is a time chart illustrating the principle of signal synchronization according to the present invention, and shows error factors of detection signals from two sensors A and B and an improvement method thereof. When completing reception of a signal A1 from the sensor A, in the case of choosing a signal B1 from the sensor B as a signal used in the vernier calculation, a time error of angle detection timings of the sensor A and the sensor B becomes Δt1 and includes a large time error. Accordingly, the present invention synchronizes a signal Ai (i=1, 2, - - - ) from the sensor A and a signal Bj (j=1, 2, - - - ) from the sensor B by means of attachment of the time stamp and signal search. In this case, for example, the present invention searches the signal Bj closest to the detection timing of the signal A1 from the buffer memory of the signal Bj. As a result, in this example, with respect to the signal A1, the signal B7 is chosen. By synchronizing the signal A and the signal B, the time error is improved from Δt1 to Δt2. Hereafter, the present invention performs the vernier calculation by using the synchronized signals (the signal A1, the signal B7) and calculates the steering angle.

Furthermore, in FIG. 3, "Δt" is a time error of the angle detection timings of the signal Ai and the signal Bj, "Δt1" is a time error before the synchronizing, and "Δt2" is a time error after the synchronizing. Further, "Δai" is "an internal processing time of the sensor A (the signal Ai)+a communication time", and "Δbj" is "an internal processing time of the sensor B (the signal Bj)+a communication time".

Figure 4:
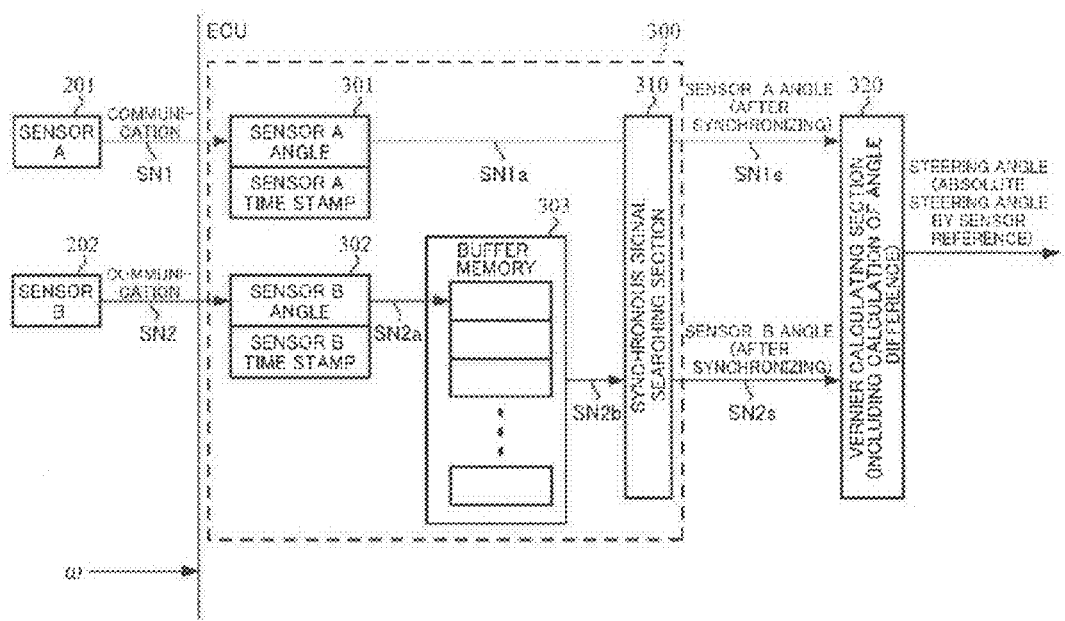
FIG. 4 is a block diagram showing a basic configuration of the present invention.

FIG. 4 shows a basic configuration example of the present invention (a steering angle calculating apparatus). As shown in FIG. 4, a detection signal SN1 of a sensor 201 (the sensor A) of the vehicle side and a detection signal SN2 of a sensor 202 (the sensor B) of the vehicle side are inputted into a signal receiving section 300 of ECU side due to the communication. The detection signal SN1 of the sensor 201 is attached the time stamp, inputted into an angle receiving section 301 and received, and then inputted into a synchronous signal searching section 310. Further, the detection signal SN2 of the sensor 202 is attached the time stamp, inputted into an angle receiving section 302 and received, and then once stored in a buffer memory 303. A stored detection signal SN2b is read out from the buffer memory 303 and inputted into the synchronous signal searching section 310. Sensor detection signals SN1s and SN2s that are searched by the synchronous signal searching section 310 as the synchronous signal, are inputted into a vernier calculating section 320 that performs the calculation of the angle difference and the vernier calculation. A steering angle that the vernier calculation is performed by the vernier calculating section 320 and by using calculation including the calculation of the angle difference (an absolute steering angle of the sensor reference (standard)), is outputted from the vernier calculating section 320. Further, a steering speed ω is inputted into the ECU.

An operation example of such a steering angle calculating apparatus will be described with reference to a flowchart shown in FIG. 5.

Figure 5:
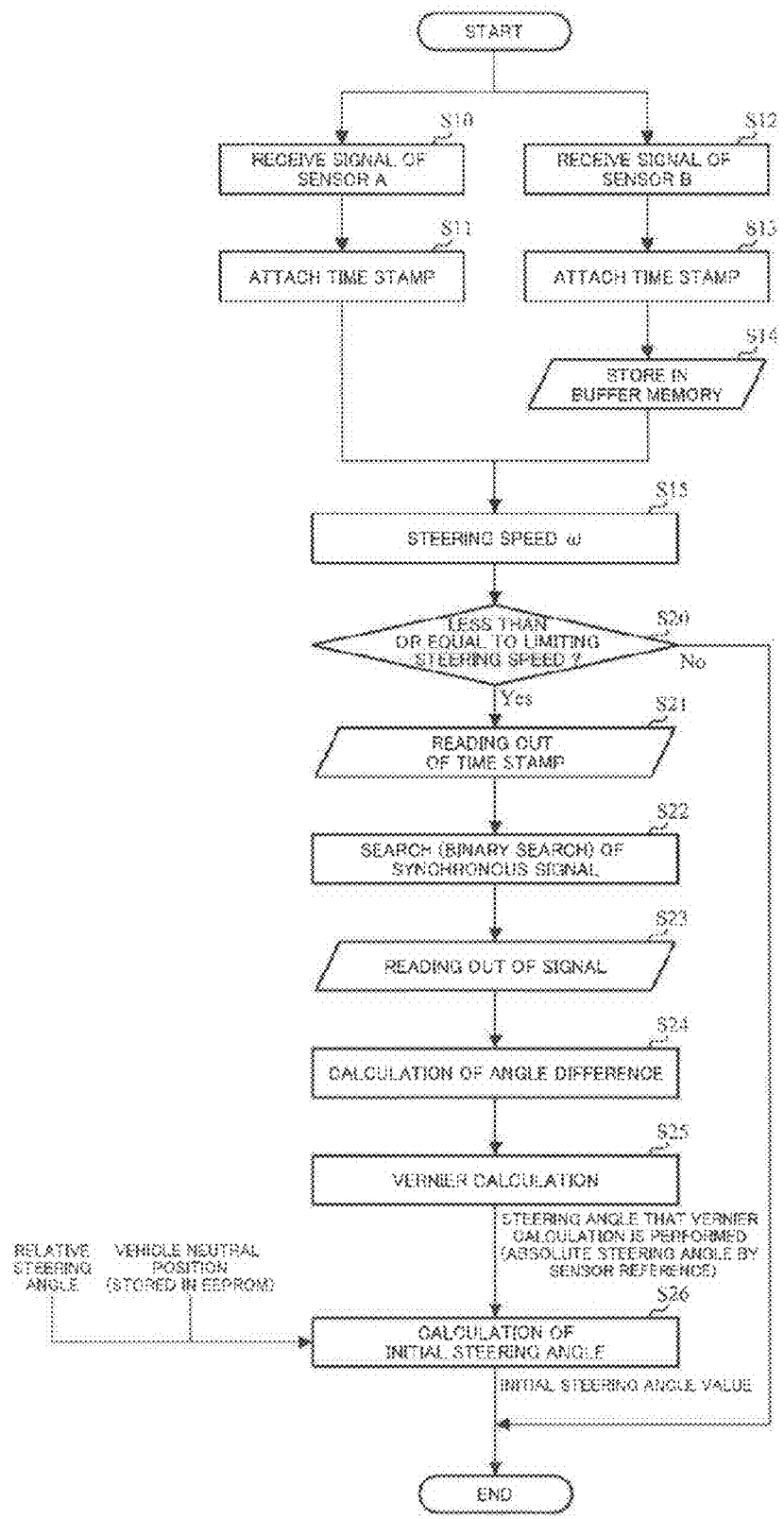
FIG. 5 is a flowchart showing an operation example of steering angle calculation.

FIG. 5 shows the operation example of the steering angle calculation. As shown in FIG. 5, the detection signal SN1 from the sensor 201 (the sensor A) is received by the angle receiving section 301 (Step S10), attached a time stamp A1 by the angle receiving section 301 and inputted into the synchronous signal searching section 310 (Step S11). A detection signal Sn1a that is inputted into the synchronous signal searching section 310, is "SN1+the time stamp A1". Further, the detection signal SN2 from the sensor 202 (the sensor B) is received by the angle receiving section 302 (Step S12), attached a time stamp B1 by the angle receiving section 302 (Step S13), in other words, and sequentially stored in the buffer memory 303 as "SN2+the time stamp B1" (Step S14). After detection signals SN2a1, SN2a2, SN2a3, - - - to which the time stamps B1, B2, B3, - - - are attached, are stored in the buffer memory 303, detection signals SN2b1 (SN2a1+the time stamp B1), SN2b2 (SN2a2+the time stamp B2), SN2b3 (SN2a3+the time stamp B3), - - - that are readout from the buffer memory 303, are inputted into the synchronous signal searching section 310.

Thereafter, the steering speed ω is inputted (Step S15), whether or not the steering speed ω is less than or equal to a limiting steering speed $\omega_0$ as a threshold, is judged (Step S20). When the steering speed ω is too fast, the angle error becomes too large, therefore, the limit is performed in a practical range of the steering. In the case that the steering speed ω is less than or equal to the limiting steering speed $\omega_0$, reading out of time stamps (A1, B1, B2, B3, - - - ) is performed (Step S21), search of the synchronous signal (the time stamp A1 and the time stamp Bj) is performed by, for example, a binary search (Step S22). Based on a search result, the detection signals, i.e. the detection signal A1 after the synchronizing and the detection signal Bj after the synchronizing are read out (Step S23), the calculation of the angle difference is performed (Step S24), further, the vernier calculating section 320 performs the publicly known vernier calculation and outputs the absolute steering angle of the sensor reference (Step S25). Then, based on an absolute steering angle, a relative steering angle and a vehicle neutral position (stored in an EEPROM), the calculation of an initial steering angle is performed, and an initial steering angle value is outputted (Step S26).

Figure 6:
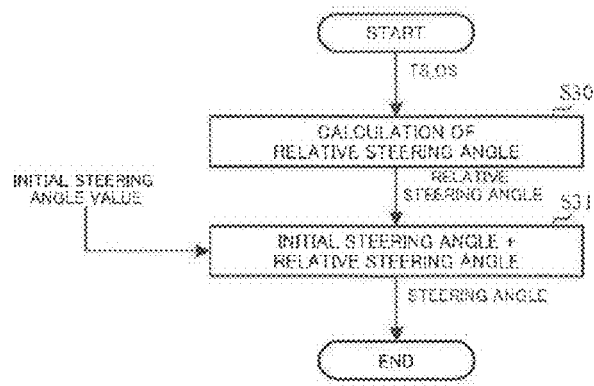
FIG. 6 is a flowchart showing a detecting operation example of the steering angle.

FIG. 6 shows a detecting operation example of the steering angle. As shown in FIG. 6, based on an angle signal TS_OS from the sensor, the calculation of the relative steering angle is performed (Step S30), the initial steering angle value obtained as stated above is added to the relative steering angle (Step S31), and the steering angle is outputted.

Next, an embodiment that applies the synchronization of the detection signals A and B, and the steering angle detection as described above to the electric power steering apparatus will be described.

Figure 7:
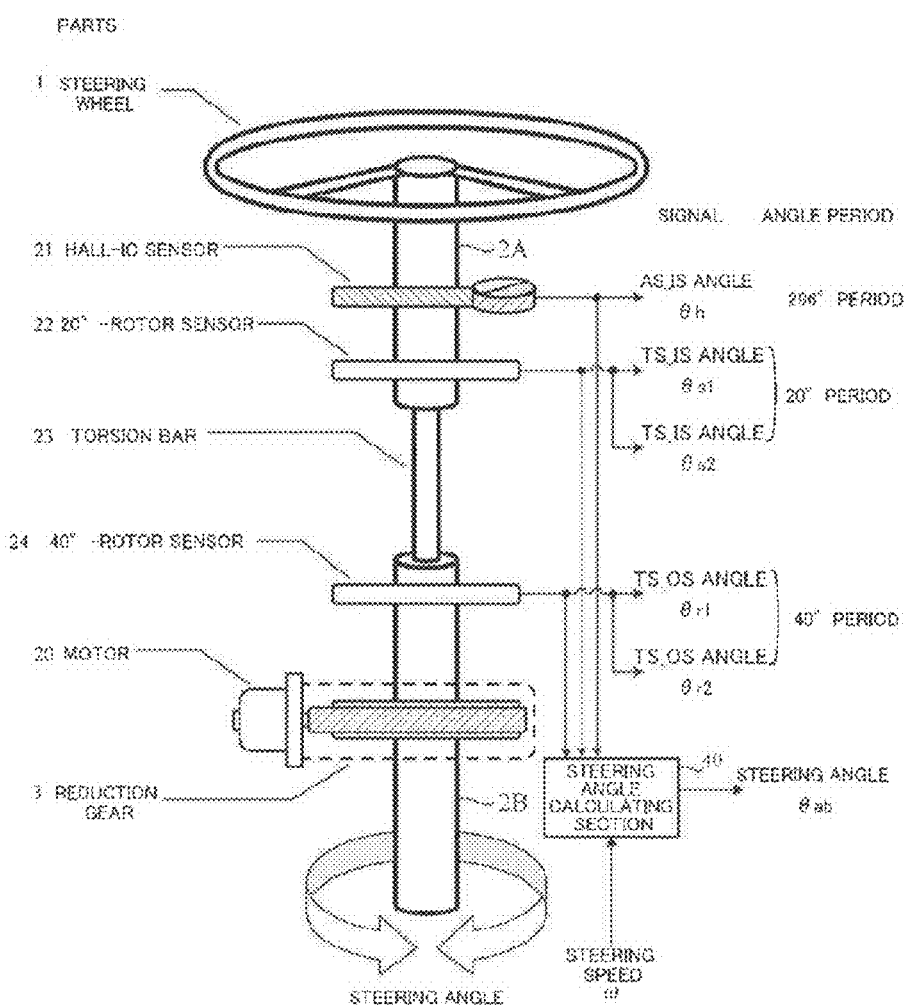
FIG. 7 is a diagram showing a relation among the electric power steering apparatus, a mounting example of sensors and those detection signals.

In the electric power steering apparatus having the torsion bar, it is necessary to detect the angle in a plurality of places, for example, as shown in FIG. 7, sensors are mounted on the column shaft (the handle shaft) 2 and various detection signals are outputted. That is to say, a Hall-IC sensor 21 as an angle sensor and a 20°-rotor sensor 22 of a torque sensor input-side's rotor are mounted on an input shaft 2A of the steering wheel 1 side of the handle shaft 2. The Hall-IC sensor 21 outputs an AS_IS angle θh of 296° period, and the AS_IS angle θh is inputted into a steering angle calculating section 40. The 20°-rotor sensor 22 that is mounted on the steering wheel 1 side than a torsion bar 23, outputs TS_IS angles θs1 (main) and θs2 (sub) of 20° period, and the TS_IS angle θs1 is inputted into the steering angle calculating section 40. Further, a 40°-rotor sensor 24 of a torque sensor output-side's rotor is mounted on an output shaft 2B of the handle shaft 2, TS_OS angles θr1 (main) and θr2 (sub) are outputted from the 40°-rotor sensor 24, and the TS_OS angle θr1 is inputted into the steering angle calculating section 40. The steering angle calculating section 40 calculates a steering angle θab of the absolute value on the basis of the AS_IS angle θh, the TS_IS angle θs1 and the TS_OS angle θr1 and outputs the steering angle θab.

Figure 8:
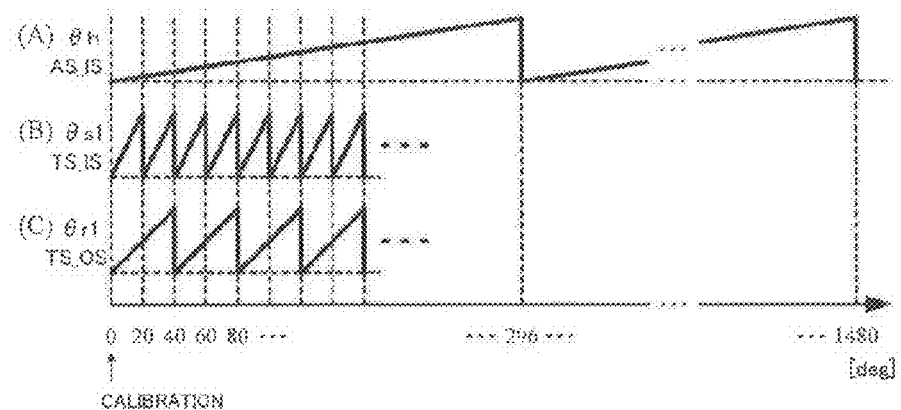
FIG. 8 is a waveform diagram showing one example of signal period of each sensor.

FIG. 8 shows one example of signal periods of the detection signals of the respective sensors. FIG. 8(A) shows the signal period (296°) of the AS_IS angle θh being the detection signal from the Hall-IC sensor 21, FIG. 8(B) shows the signal period (20°) of the TS_IS angle θs1 being the detection signal from the 20°-rotor sensor 22, and FIG. 8(C) shows the signal period (40°) of the TS_OS angle θr1 being the detection signal from the 40°-rotor sensor 24. A "0-point" adjustment of these three sensors is adjusted by calibration at assembling.

Figure 9:
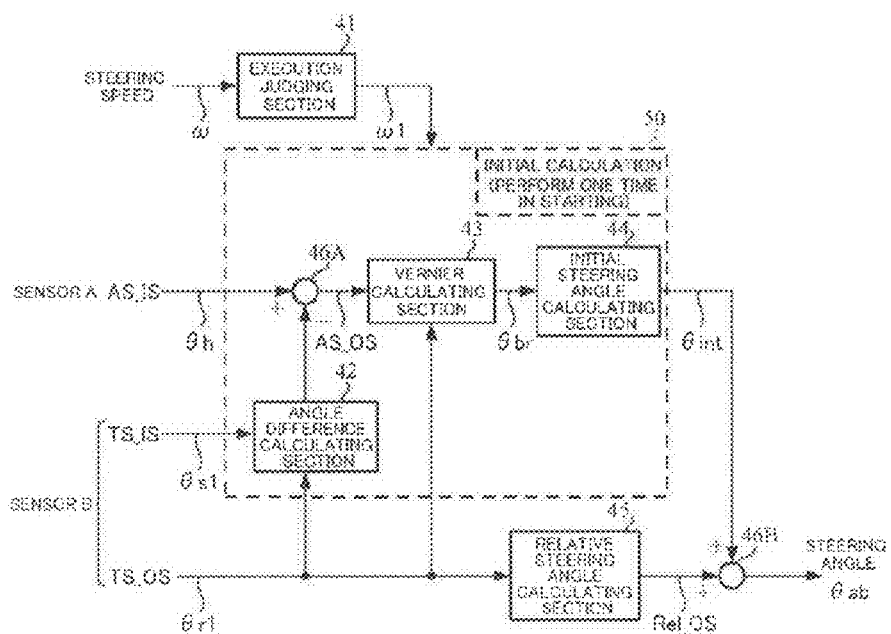
FIG. 9 is a block diagram showing a configuration example of a steering angle detecting apparatus.
Figure 10:
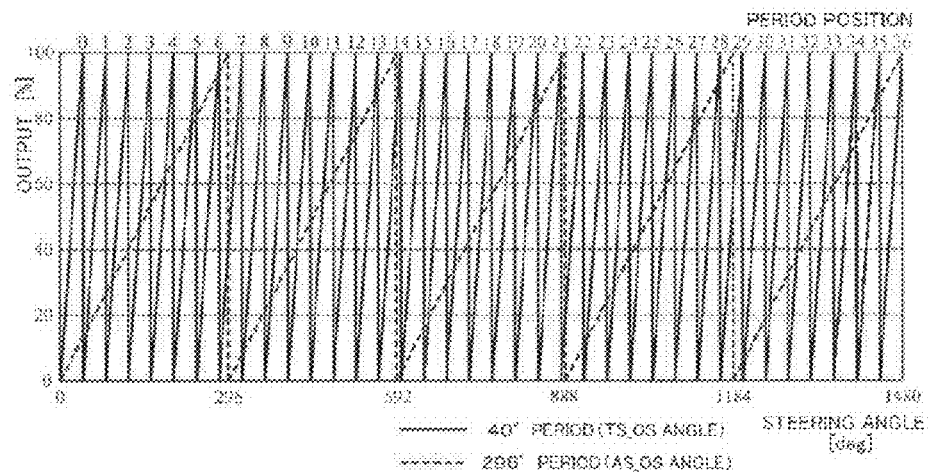
FIG. 10 is a waveform diagram showing angle signals of 40° period and 296° period.

FIG. 9 shows a configuration example of the steering angle calculating section 40. As shown in FIG. 9, the steering speed ω is inputted into an execution judging section 41, and a steering speed ω1 judged by the execution judging section 41 is inputted into a calculating section 50. The AS_IS angle θh from the Hall-IC sensor 21 corresponding to the sensor A is addition-inputted into a subtracting section 46A within the calculating section 50, the TS_IS angle θs1 from the 20°-rotor sensor 22 corresponding to the sensor B and the TS_OS angle θr1 from the 40°-rotor sensor 24 corresponding to the sensor B are inputted into an angle difference calculating section 42, and an angle difference (=θs1−θr1) is calculated by the angle difference calculating section 42 and subtraction-inputted into the subtracting section 46A. A subtraction angle AS_OS (=θh−(θs1−θr1)) obtained by the subtracting section 46A is inputted into a vernier calculating section 43. A vernier calculating means comprises the angle difference calculating section 42, the subtracting section 46A and the vernier calculating section 43. Further, the TS_OS angle θr1 from the 40°-rotor sensor 24 corresponding to the sensor B is inputted into the vernier calculating section 43 and also inputted into a relative steering angle calculating section 45.

A steering angle θbr (the absolute steering angle of the sensor reference) calculated by the vernier calculating section 43 is inputted into an initial steering angle calculating section 44, and a calculated initial steering angle value θint is outputted. The calculating section 50 performs the above calculation one time in the starting time and outputs the initial steering angle value θint. The initial steering angle value θint from the calculating section 50 is inputted into an adding section 46B, and a relative steering angle Rel_OS calculated by the relative steering angle calculating section 45 is also inputted into the adding section 46B. A steering angle θab (=θint+Rel_OS) obtained by addition of the adding section 46B is outputted from the adding section 46B comprising a steering angle output section.

Since the steering angle calculating section 40 constantly outputs the steering angle θab that sets the vehicle neutral position as the "0-point", the steering angle calculating section 40 performs the vernier calculation one time by the vernier calculating section 43 in the starting time from the subtraction angle AS_OS and the TS_OS angle θr1, and obtains a correction value for correcting the relative steering angle of the TS_OS angle θr1 to the absolute steering angle of the sensor reference. Further, the steering angle calculating section 40 obtains the initial steering angle value θint from the correction value and the vehicle neutral position. After obtaining the initial steering angle value θint, by adding the relative steering angle of the TS_OS angle θr1 to the initial steering angle value θint, it is possible to constantly output the steering angle θab of absolute value from the adding section 46B comprising the steering angle output section.

The vernier calculation is a calculation that obtain period positions "0~36" (the number of rotations counted from the steering angle 0°) of the 40°-rotor sensor 24 in output shaft side by utilizing a phase difference between the sensor signals that are different in the period (for example, 40° period, 296° period). Thereby, it is possible to judge which position of a steering angle region "0~1480°" the 40°-rotor sensor 24 is in. Further, the subtraction angle AS_OS (an output shaft side's angle of 296° period) is generated for the vernier calculation. That is, the amount of a torsion angle of the torsion bar 23 (the angle difference between the TS_IS angle θs1 and the TS_OS angle θr1) is subtracted from the AS_IS angle θh being the detection signal from the Hall-IC sensor 21 in an input shaft side.

In general, in the case of performing the vernier calculation, when a difference between a large period becoming a reference and a small period is small, the error becomes small. When the period of a small cycle is too fine (a difference between a large cycle and the small cycle is large), it is thought to falsely recognize a neighbor value of the small cycle. Further, since the EPS apparatus comprises the torsion bar, a rotation angle of the steering wheel itself and the steering angle of the vehicle cause a displacement of the amount of torsion characteristics of the torsion bar.

Therefore, the present invention employs a configuration that performs the vernier calculation between the sensor (24) of rack-and-pinion side than the torsion bar (23) and the sensors (21, 22) of steering wheel side than the torsion bar (23), provides the sensor (22) of steering wheel side than the torsion bar (23) and corrects the amount of the torsion by using the sensors at front/rear of the torsion bar.

Figure 11:
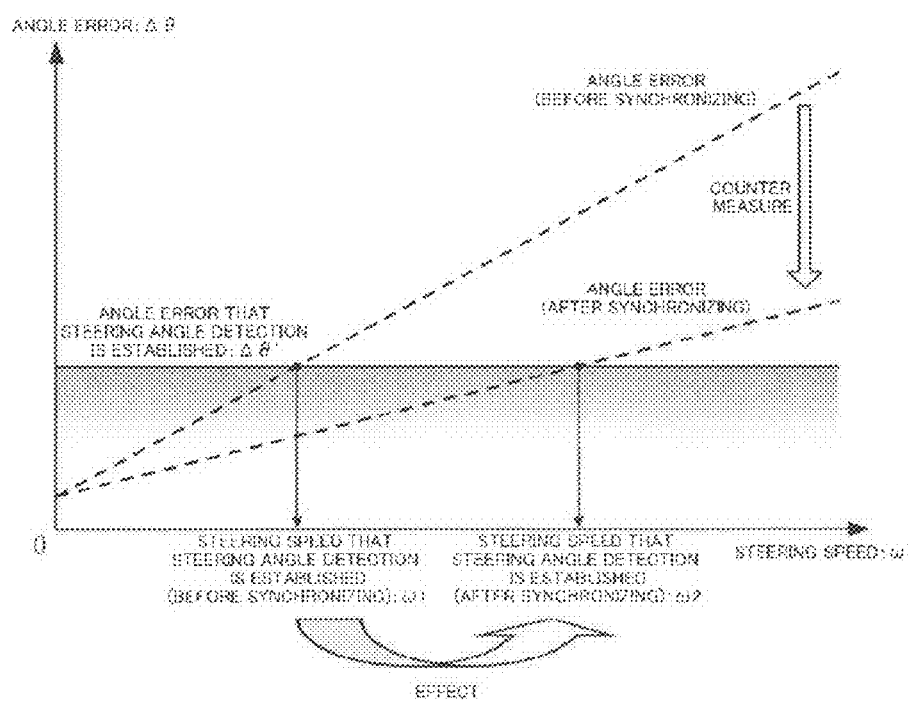
FIG. 11 is a diagram showing effects of the present invention (the steering speed that the steering angle detection is established becomes high by reducing the angle error).

FIG. 11 shows effects of the present invention, as a prerequisite, since an angle error Δθ' that the steering angle detection (vernier) is established depends on the sensor, the angle error Δθ' becomes a constant value. In this case, with respect to the angle error Δθ, the following Expression 1 holds. That is, the angle error Δθ increases and decreases in proportion to the steering speed ω.

angle error Δθ=steering speed ω×time error Δt    [Expression 1]

As a countermeasure, by implementing the synchronization of the signals, the time error Δt of the detection timing between the signals of the sensor A and the sensor B is reduced. That is, by synchronizing the detection signals, the angle error becomes small. As a result, the steering speed ω that the steering angle detection is established becomes high like "ω1→ω2". In this way, when the steering speed that the steering angle detection is established is improved from ω1 (for example, 20°/s) to ω2 (for example, 200°/s), the function of the steering angle detection is sufficiently established as the EPS.

Moreover, in the above embodiments, although only the sensor B that the period is small, is searched, if it is possible to earn the arithmetic capacity of CPU and the capacity of the buffer memory, similarly, it is also possible to store data with time stamp and search the sensor A that the period is large.

EXPLANATION OF REFERENCE NUMERALS 1 steering wheel
2 column shaft (steering shaft, handle shaft)
10 torque sensor
12 vehicle speed sensor
13 battery
20 motor
21 Hall-IC sensor
22 20°-rotor sensor
23 torsion bar
24 40°-rotor sensor
30 control unit (ECU)
31 current command value calculating section
33 current limiting section
34 compensating section
35 PI control section
36 PWM control section
37 inverter circuit
40 steering angle calculating section
41 execution judging section
42 angle difference calculating section
43 vernier calculating section
44 initial steering angle calculating section
45 relative steering angle calculating section
200 steering angle control section
201 sensor (A)
202 sensor (B)
300 signal receiving section
301,302 angle receiving section
303 buffer memory
310 synchronous signal searching section
320 vernier calculating section

The invention claimed is:

1. An electric power steering apparatus that performs an assist control of a steering by driving a motor by means of a current command value calculated on a basis of at least a steering torque, comprises at least sensors (A and B) being different in periods, and has a function to detect a steering speed, comprising:
  a time stamp attaching section that attaches a time stamp (ATi) to a detection signal (Ai) of said sensor (A) and attaches a time stamp (BTj) to a detection signal (Bj) of said sensor (B);
  a storing section that stores said detection signal (Bj) to which said time stamp (BTj) is attached;
  a synchronous signal searching section that searches said detection signal (Bj) most synchronized with said detection signal (Ai) from said storing section based on said time stamps (ATi and BTj);
  a vernier calculating section that performs a calculation of an angle difference between synchronous signals searched by said synchronous signal searching section and a vernier calculation and outputs an absolute steering angle of a sensor reference;
  an initial steering angle calculating section that calculates an initial steering angle value from said absolute steering angle; and
  a steering angle output section that obtains a steering angle based on a relative steering angle from said sensor (B) and said initial steering angle value.

2. An electric power steering apparatus according to claim 1, further including a comparing section that compares said steering speed with a threshold, and
  when said steering speed is less than or equal to said threshold, search of said synchronous signals, said calculation of said angle difference and said vernier calculation are performed.

3. An electric power steering apparatus according to claim 1, wherein a period of said sensor (A) is longer than a same of said sensor (B).

4. An electric power steering apparatus according to claim 2, wherein said threshold is a limiting steering speed of a practical steering speed.

5. An electric power steering apparatus according to claim 1, wherein said search of said synchronous signal searching section is a binary search.

6. An electric power steering apparatus according to claim 2, wherein said vernier calculating section once performs a vernier calculation at a starting time and obtains a correction value to correct said relative steering angle to said absolute steering angle.

7. An electric power steering apparatus according to claim 6, wherein said initial steering angle calculating section obtains an initial steering value from said correction value and a vehicle neutral position, and said steering angle output section constantly outputs said steering angle based on said initial steering value and said relative steering angle.

8. An electric power steering apparatus according to claim 7, wherein said steering angle output section comprises a relative steering angle calculating section to calculate said relative steering angle from an output angle of said sensor B, and an adding section to output said steering angle by adding said correction value and said initial steering value.

9. An electric power steering apparatus according to claim 7, wherein said vehicle neutral position is stored in an Electrically Erasable Programmable Read-Only Memory (EEPROM).

* * * * *